United States Patent Office 3,796,805
Patented Mar. 12, 1974

3,796,805
PROCESS FOR PRODUCING COFFEE EXTRACT
Pierre Lemonnier, Lamorlaye, Jacques Cardozo, Epiais-Rhus, and Georges Grandgury, Maison-Alfort, France, assignors to General Foods Corporation, White Plains, N.Y.
No Drawing. Filed July 27, 1972, Ser. No. 275,672
Int. Cl. A23f 1/08
U.S. Cl. 426—388                     3 Claims

ABSTRACT OF THE DISCLOSURE

A process for producing coffee extract from a blend of at least two coffee varieties of differing quality comprising separately roasting and grinding each coffee variety, separately loading each variety into an extraction vessel, and contacting the coffees, with an aqueous extraction liquid.

BACKGROUND OF THE INVENTION

This invention relates to soluble coffee and more particularly to the production of soluble coffee extract.

It is well known in the art of producing coffee brews to employ a blend of different coffee varieties to achieve a desirable, pleasing, yet economic coffee product. The use of coffee blends is designed to take advantage of the particular attributes of given coffee varieties, examples of such attributes being flavor, body, cost, and the like. Generally there are three major coffee bean types, namely, Brazilians, Robustas, and milds at least two of which are present in most commercial coffee blends. Within this broad category, of course, are a host of other bean varieties all different to some degree in flavor characteristics. Generally the milds are used in a blend to contribute their fragrant, pleasant flavor characteristics and body. Brazilians, while contributing less aromatics to a blend than the milds, are relatively good quality beans and are generally cheaper than the milds. Robustas generally have a strong, bitter flavor yet are attractive to the coffee processor due to their low price.

It is also known to separately roast the coffee varieties which make up the final coffee blend so as to achieve the optimum desirable characteristics from each variety. Further, separate grinding of separately roasted coffee varieties, such as described in U.S. Pat. 3,544,331, has been used as a means of increasing or decreasing (depending upon the particular grind employed) the contribution that a coffee variety imparts to a blend.

In the commercial production of soluble coffee, a soluble coffee extract is prepared by contacting roasted and ground coffee with an aqueous extraction liquid, such as water, in a suitable extraction vessel. The extract is then dried according to any of the well known methods to form soluble coffee powder.

SUMMARY OF THE INVENTION

A novel process for producing a coffee extract from a blend of at least two coffee varieties of differing quality has been discovered wherein each coffee variety is separately roasted and ground, separately loaded into an extraction vessel, and then contacted with an aqueous extraction liquid to form a coffee extract.

While every separate coffee bean variety has its desirable attributes, whether they be flavor, body, cost, or the like, it is generally recognized that the milds, for example, are a higher quality bean than the Brazilians, which are in turn of higher quality than the Robustas. Such a classification is generally, and as used herein, predicated on the flavor and aroma properties associated with each separate coffee variety, with the higher quality coffees contributing the better flavor and aroma to the blend.

In the standard commercial process for producing coffee extract, roasted and ground coffee is contacted with an aqueous extraction liquid in a suitable extraction vessel such as the extraction columns of a percolator set. At steady-state operation, the extraction columns (generally 5 to 8 columns) contain roasted and ground coffee of varying degrees of extraction progressing from the most extracted coffee in the set to the freshest or least extracted coffee. The extraction liquid is heated and fed to the column containing the most spent roasted and ground coffee (the spent stage), contacts the coffee contained therein, passes out of the spent stage into the next adjacent stage containing the next most extracted coffee in the set, and continues in such a manner passing through succesive columns of progressively fresher roasted and ground coffee. After passing through the extraction column containing the freshest roasted and ground coffee in the set (the fresh stage), a predetermined quantity of coffee extract is drawn off completing a cycle, cycle being defined as the time elapsed between successive draw-offs from the fresh column. To begin the next cycle, the spent stage is taken off-stream, a new fresh stage is placed on-stream, aqueous extraction liquid is fed to the spent stage for this cycle, this stage being the extraction column containing the next most extracted coffee in the previous cycle, and the extraction is continued. With each successive cycle, then, a given charge of roasted and ground coffee becomes progressively more extracted.

As the extraction liquid moves through a given column of coffee, the liquid cools thus becoming a less efficient extraction medium. Further, as the extraction column is filled with liquid, the coffee nearest the entering liquid is in contact with the liquid for a longer period of time than the coffee nearest the existing liquid.

It has been found advantageous to separate the different coffee varieties which make up a coffee blend within the extraction columns of the percolator set. By employing such a method it is possible to achieve a variety of resultant coffee extracts heretofore unavailable. Further, by varying the roast color, grind, and position within the extraction column for each coffee variety, the optimum contributions of each specific variety can be imparted to the soluble coffee extract.

DETAILED DESCRIPTION OF THE INVENTION

When extracting a blend of coffees with an extraction liquid, it is a primary objective to achieve the optimum flavor, aroma, body, and other characteristics of each coffee variety in the blend. Even when extracting a blend prepared by first roasting to the optimum color for each coffee variety, then grinding each variety separately to achieve the optimum contribution from each variety, and then blending the ground coffee varieties in some optimum blend proportion, it is found this objective is not obtained. For example, extracting a coffee blend prepared as above using and upward flow of aqueous extraction liquid through the extraction column results in the coffee near the bottom of the extraction column being in contact with the extraction liquid for a longer period of time, due to the time necessary to fill the column and at hotter temperatures. On the other hand, the coffee at the top of the extraction column is subject to less severe heat treatment for a shorter period of time. Such heat distribution and contact time results in the coffee at the bottom of the column being extracted more fully. This inefficiency and unequal heat treatment is inherent in a percolation system and this inherent deficiency is uniquely put to a beneficial use by the process of this invention.

In addition, the process of this invention, retains and further optimizes the benefits achieved through separately roasting and grinding each coffee variety by further separately loading each variety into a different zone in the extraction column. The parameters of roast color, grind size, and position in the column may then be varied to achieve a variety of desirable results.

For example, to prepare a coffee extract having improved aroma and flavor characteristics it is desirable to maximize the contribution of the milds portion of the blend. By placing the milds in the upper zone of the extraction column, assuming an upward flow of extraction liquid through the extraction column, it is possible to minimize the severity of the heat treatment to which the milds are subjected. Thus, fewer of the aroma and flavor notes are damaged since the milds are contacted with relatively cooler extraction liquid for a shorter residence time. In order to recover a significant portion of the soluble solids from the milds, it is preferred to grind them to a finer particle size than the other beans in the blend. Finer grinds, due to the exposure of more surface area, are more easily extracted and therefore do not require stringent extraction conditions. Using the same example, it may also be desirable to load the poorer quality beans, such as the Robustas, into the bottom of the extraction column. Being of poorer quality, the more severe heat treatment experienced at the bottom of the column is less damaging to these beans. Here, it may also be desirable to grind the poorer quality beans to a relatively coarse particle size to minimize their flavor contribution to the blend. While coarser particles generally extract less efficiently, the hotter temperatures of the extraction liquid contacting these particles and the longer residence time of contact makes possible the recovery of a significant portion of the available soluble coffee solids.

A second example of the application of the process of this invention is its use to maximize the soluble solids recovery from the higher quality bean varieties. Thus, the better quality coffee variety in the blend is loaded into the bottom of the extraction column (for an upflow of extraction liquid). The more severe extraction conditions at the entrance of the extraction column causes the roasted and ground coffee at that point to be extracted more efficiently. Again, a further increase in coffee solids recovery may be effected by grinding the better quality bean to a relatively fine particle size. The poorer quality bean variety in the upper zone of the extraction column, contributes less to the final coffee extract composition by virtue of its being extracted less efficiently with the cooler extraction liquid. The contribution from these beans may be further minimized by grinding them to a relatively corase particle size.

In the first example shown, the process of the invention is used to attempt to increase the quality of the final extract by exposing the milder coffee to less stringent percolator temperatures. In the second example the process of this invention is being used to maximize the rate of extraction from the milds coffee. In either case, the position of coffees would be reversed if the flow of liquid through the stages was reversed. It should be apparent from the above discussion of certain embodiments of this invention, that the results obtained are not achievable merely by extracting a blend of coffees, even when blended after separately roasting and grinding.

According to the process of this invention, however, the maximizing or optimizing of a blend achieved through separate roasting and grinding of the separate bean varieties is further increased by separately loading the coffee varieties in the extraction column so as to achieve the optimum extraction conditions for each coffee variety. By varying the roast color, grind, blend proportions, and position within the extraction column for each type coffee, a variety of desirable results are achievable. It should be apparent of course, that the process of this invention is applicable to both decaffeinated and undecaffeinated coffees.

While the description of this invention makes use of terms relating to particle size, they are intended to be relative terms as used herein. While it is appreciated that no commercial grinding process results in uniform particle sizes but rather achieves a range of particle sizes, it is a common practice in the coffee art to speak in terms of coarse grind, fine grind and so on to describe ground coffees having, respectively, a relatively larger portion of large particles or smaller particles. Thus as used herein, grinding to a relatively finer particle size than other beans in the blend is merely descriptive of a coffee variety having a larger portion of fine particles than some other variety in the blend. Also, the particular grind size used by different coffee manufacturers varies, and it would be a simple matter for an individual to adjust his grind coarser or finer according to his individual needs in practicing the process of this invention.

The extraction liquid which is contacted with the coffee varieties, while generally water, may be any water solution of salts or other solids, such as soluble coffee solids, and is generally heated to about 200° F. to 350° F. prior to entering the spent stage of the percolator set, if such an extraction process is employed. Also, it is common practice to adjust the temperature of the extract entering the fresh stage percolator (generally by cooling) if necessary to insure that the extract drawn off does not exceed about 210° F.

The following example is descriptive of a preferred embodiment of this invention.

EXAMPLE I

A percolator set comprising six extraction columns with water as the extraction medium is used to prepare a coffee extract from a blend of coffees. The coffee blend is prepared by first roasting milds to a roast color of about 55 as determined by a light reflectance meter. Brazilians are roasted to a color of about 60 while Robustas are roasted to about 75–80. The roasted coffee varieties are then separately ground to a grind distribution, based on the U.S. Standard Screens, approximately as follows:

|  | Milds | Brazilians | Robustas |
| --- | --- | --- | --- |
| Percent on: |  |  |  |
| 12 | 0 | 4 | 10 |
| 16 | 2 | 25 | 45 |
| 20 | 38 | 41 | 25 |
| 30 | 40 | 18 | 10 |
| Pan | 20 | 12 | 10 |

The coffee varieties are then separately loaded into the extraction columns. The Robustas are loaded first such that they are in the lower zone of the extraction column, the Brazilians are next loaded and are therefore in the intermediate zone of the column, and the milds are loaded last thus being in the upper portion of the extraction column. Each column, based on the total weight of the coffee contained therein, contains 34% milds, 40% Brazilians, and 26% Robustas.

At continuous operation, each column contains the separately loaded coffee varieties in varying degrees of extraction, progressing from the most extracted roasted and ground coffee to the freshest or least extracted coffee in the set from which the final coffee extract is drawn-off. Water is heated to 350° F. and passed into the bottom of the spent stage of the percolator set containing the most exracted coffee in the set. After contacting each separately loaded coffee variety and exiting from the spent stage, the extraction liquid, now a relatively dilute solution of soluble coffee solids, is passed upwards into the next adjacent column containing the next progressively freshest coffee in the set. The temperature of the entering liquid is 345° F. and exits at 320° F. The extraction liquid continues in this manner to pass upwards through the extraction columns, contacting the progressively fresher coffee contained therein, and increasing in soluble solids concentration. Just prior to passing into the fresh stage, the extraction liquid is cooled to 220° F. After passing through the extraction column containing the freshest roasted and ground coffee in the set, a pre-determined quantity of coffee extract is drawn-off from this fresh stage at a soluble solids concentration of about 26% by weight and a temperature of about 200° F., marking the completion of a cycle. To begin the next cycle the spent stage is blown-down to remove the coffee contained therein and is charged separately with fresh coffee varieties of similar color, grind, and proportion as the coffees already present in the set and maintaining the same relative positions for each variety within the column.

While specific examples have been employed in the description of this invention, they are merely illustrative of the many and varied embodiments of the process of this invention. It will thus be apparent to those skilled-in-the-art that various changes, additions, and modifications may be made without departing from the scope of this invention as defined in the appended claims.

We claim:
1. In a method of producing a coffee extract by contacting a blend of at least two varieties of coffees of differing quality with an aqueous extraction liquid in an extraction column, and wherein each coffee variety is separately roasted and ground, the improvement comprising separately loading each coffee variety into separate zones within the extraction column.

2. The method of claim 1 wherein the higher quality coffee variety is loaded into said extraction column such that said higher quality coffee is the last coffee variety contacted by the extraction liquid.

3. The method of claim 2 wherein said higher quality coffee variety is ground to a finer particle size than the lesser quality coffee varieties.

References Cited
UNITED STATES PATENTS 3,644,123  2/1972  Pitchon _____ 99—71
3,544,331  12/1970  Hair _____ 99—68

FRANK W. LUTTER, Primary Examiner

W. L. MENTLIK, Assistant Examiner

U.S. Cl. X.R.
426—432